United States Patent [19]

Miller et al.

[11] 4,026,597

[45] May 31, 1977

[54] COLLAPSIBLE OVERHEAD GUARD

[75] Inventors: Robert Henry Miller, Cleveland; John Paul Yost, Willoughby, both of Ohio

[73] Assignee: Towmotor Corporation, Mentor, Ohio

[22] Filed: Dec. 22, 1975

[21] Appl. No.: 643,413

[52] U.S. Cl. .............................................. 296/107

[51] Int. Cl.$^2$ .............................................. B60J 7/24

[58] Field of Search ............ 296/107, 102; 280/756

[56] References Cited

UNITED STATES PATENTS

| | | | |
|---|---|---|---|
| 2,263,981 | 11/1941 | Dalecke | 280/756 |
| 2,714,387 | 8/1955 | Meldrum | 296/102 X |
| 3,259,211 | 7/1966 | Ryskamp | 296/102 |
| 3,289,871 | 12/1966 | Tournau | 296/102 |
| 3,455,599 | 7/1969 | Becker | 296/102 |

FOREIGN PATENTS OR APPLICATIONS

| | | | |
|---|---|---|---|
| 94,756 | 8/1959 | Norway | 280/756 |

*Primary Examiner*—Robert R. Song
*Attorney, Agent, or Firm*—Phillips, Moore, Weissenberger, Lempio & Majestic

[57] ABSTRACT

A collapsible overhead guard for use with an industrial vehicle or the like may be easily lowered so as to accommodate vehicle operation in areas where low overhead clearance is encountered. The guard includes forward and rear telescoping support members joined by a substantially rectangular roof member. The front telescoping support members are rigidly fixed to the roof member and to the vehicle and include bearing mounted rollers to facilitate relative movement. The rear telescoping support members are pivotally connected to the roof member and to the vehicle so that the generally horizontal orientation of the roof member is maintained. Locking means including retractable pins on each support member are provided for retaining the collapsible overhead guard in a plurality of positions.

8 Claims, 5 Drawing Figures

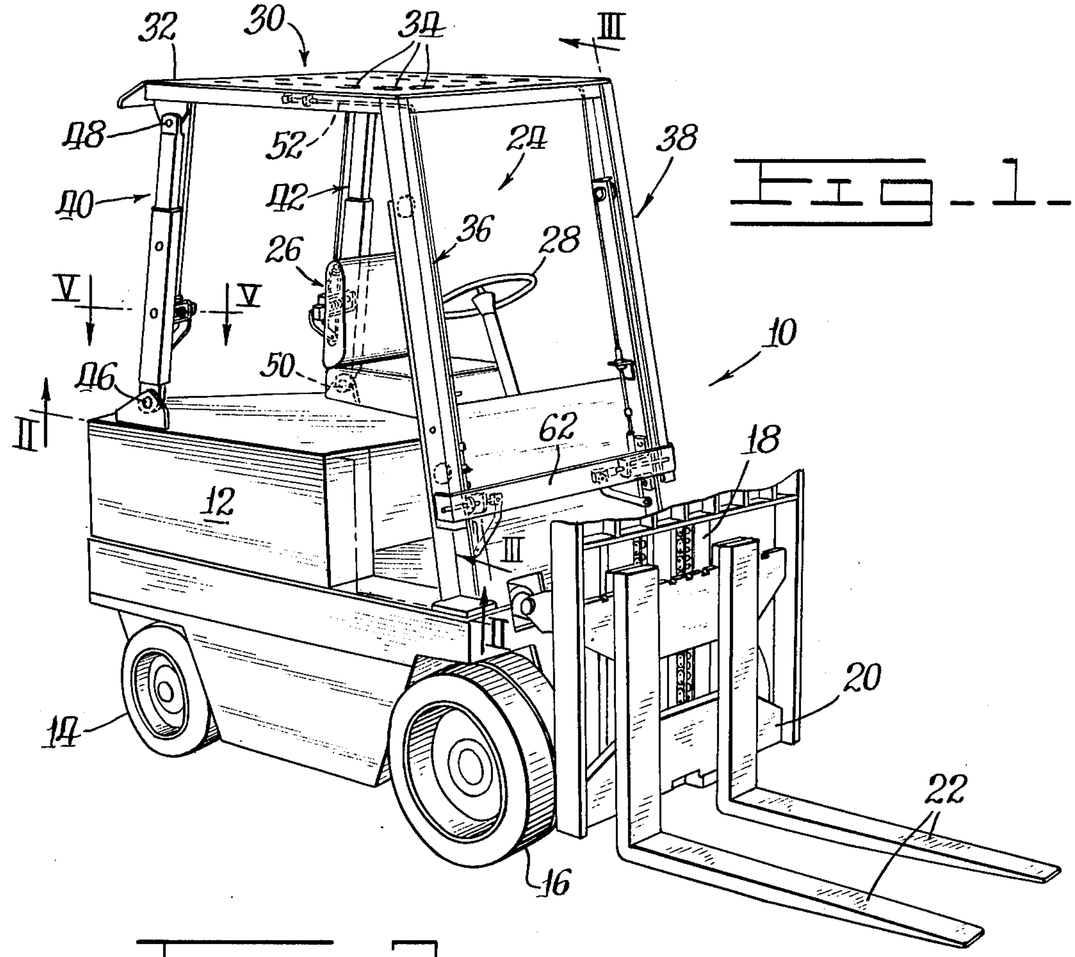
Fig. 1
Fig. 2
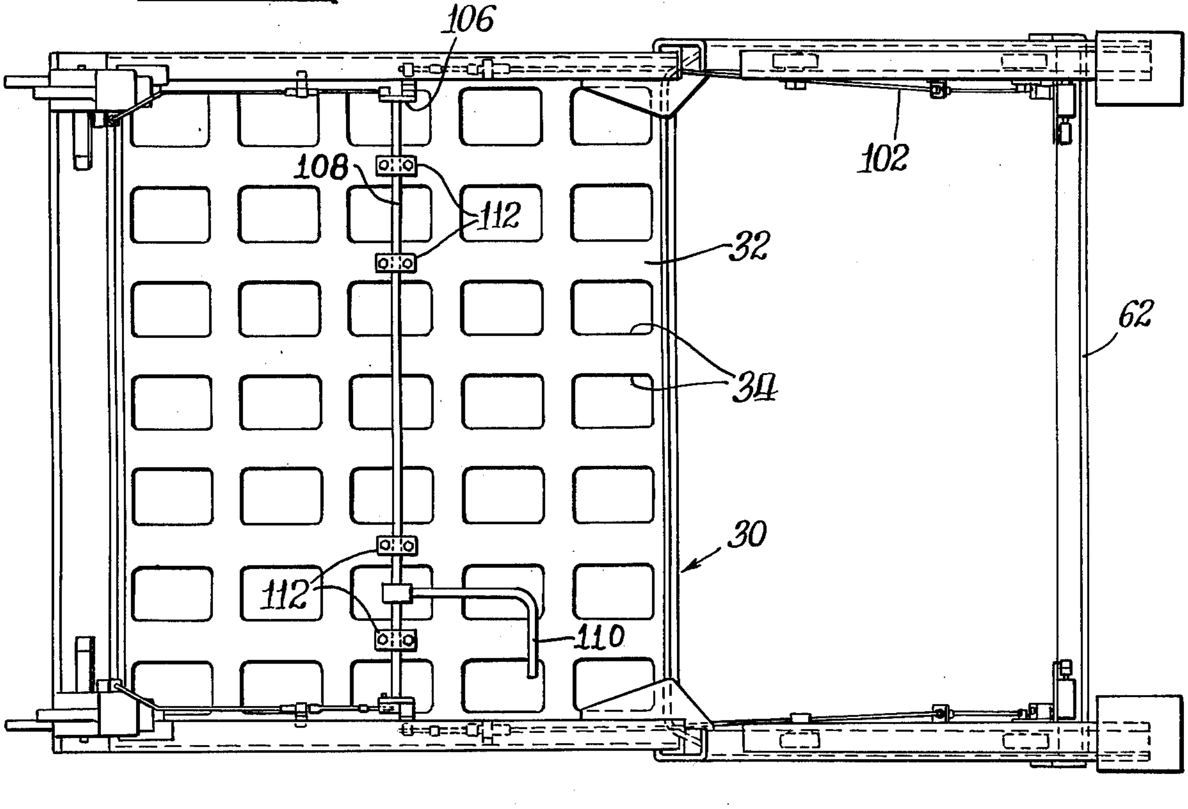

COLLAPSIBLE OVERHEAD GUARD

BACKGROUND OF THE INVENTION

This invention relates to an overhead guard for an industrial vehicle such as a lift truck, which may be quickly retracted or lowered to allow the vehicle to operate in areas of low overhead clearance. In particular, this invention relates to such a retractable overhead guard which may be simply and easily lowered or raised by manual means.

Currently, vehicles such as lift truck vehicles are frequently equipped with overhead guards to prevent operator injury from falling objects. These falling objects may be dropped from, for example, overhead cranes, or may be dislodged from adjoining stacks in storage warehouses by collision of the vehicle itself with such stacks. While an efficient and desirable feature, these overhead guards tend to limit the operation of the truck, especially when encountering low overhead environments. Accordingly, it is desirable to be able to lower or retract the overhead guard in order to operate in these environments. U.S. Pat. No. 3,259,211 to Ryskamp shows a retractable overhead guard which may be hydraulically lowered and retracted to the rear of the vehicle when encountering low overhead environments. However, when such patent device is retracted, the operator is necessarily left unprotected. This is undesirable for obvious reasons.

SUMMARY AND OBJECTS OF THE INVENTION

It is therefore the primary object of this invention to provide a collapsible overhead guard which effectively lowers the overall vehicle height while at the same time still protecting the operator.

It is a further object of this invention to provide such an overhead guard which is easily retracted and raised by manual means.

The invention takes the form of an overhead guard comprising a pair of front and rear telescoping members joined by a horizontal roof member. The front telescoping members each include a first L-shaped member and a second U-shaped member retained and guided by rollers rotatably attached therebetween.

The telescoping rear members include a pair of nesting, box-shaped hollow members which are slidingly telescoped together. The rear support members are pivotally attached to both the roof member and the vehicle, while the forward support members are rigidly attached thereto whereby the horizontal orientation of the roof member is maintained throughout the raising and lowering of the collapsible overhead guard. Spring means are provided whereby the guard is biased to the raised position. In addition, retractable pin type locks are included with each of the support members and axiable by a manually operable handle on the underside of the lift member so that the overhead guard may be locked in both the raised and lowered positions.

Further and other objects and advantages of this invention will become more readily apparent from a review of the accompanying drawings and following description.

BRIEF DESCRIPTION

FIG. 1 is an overall isometric view of a lift truck vehicle incorporating the retractable overhead guard of the instant invention;

FIG. 2 is a view taken along the lines II—II in FIG. 1 and showing details of the locking mechanism;

DETAILED DESCRIPTION

Figure 3:
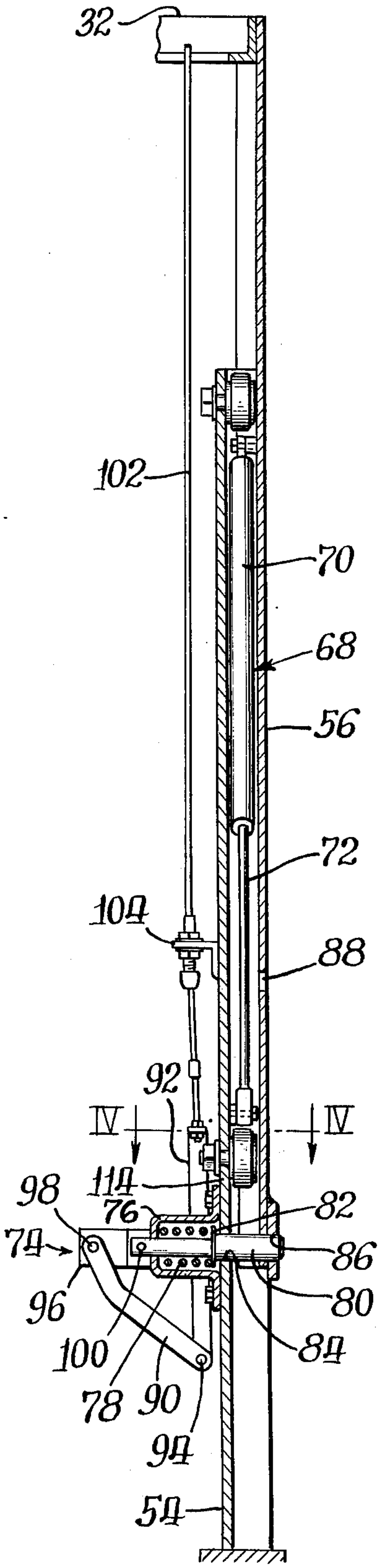
FIG. 3 is a cross-sectional view taken along the lines III—III in FIG. 1.

Turning to FIG. 1, there is shown generally at 10 a vehicle in the form of a fork lift truck. It is to be understood that while this discussion talks in reference to fork lift trucks, other types of vehicles are contemplated for the application of the instant invention.

The truck 10 generally includes a body 12 supported by a plurality of wheels, two of which are shown in 14,16. The vehicle includes a lift mast 18 partially cut away for purposes of clarity, supporting a vertically movable carriage 20 having a pair of forks 22 mounted thereon. An operator station generally shown at 24 sits astride the vehicle. Operator support is provided by seat 26 mounted on the vehicle body. The vehicle is steered by means of steering wheel 28.

In order to protect the operator, a collapsible overhead guard shown generally at 30 is mounted on the vehicle body 12. Guard 30 comprises generally rectangular plate-like roof member 32 having a plurality of rectangularly shaped openings 34 therein. Such openings afford operator visibility in a vertical direction. Rigidly fixed to the front corners of roof member 32 as well as the vehicle body 12 are a pair of telescoping supporting members 36,38. Pivotally connected to the rear corners of roof member 32 are a pair of telescoping rear support members 40,42. Rear telescoping support members 40,42 are joined to the vehicle body 12 and roof member 32 by means of a plurality of pivots 46,48,50,52. In this manner, rear support members 40,42 may articulate about the pivots as the overhead guard is raised and lowered. Thus, the horizontal orientation of the roof member 32 is maintained regardless of the vertical position of the guard.

Figure 4:
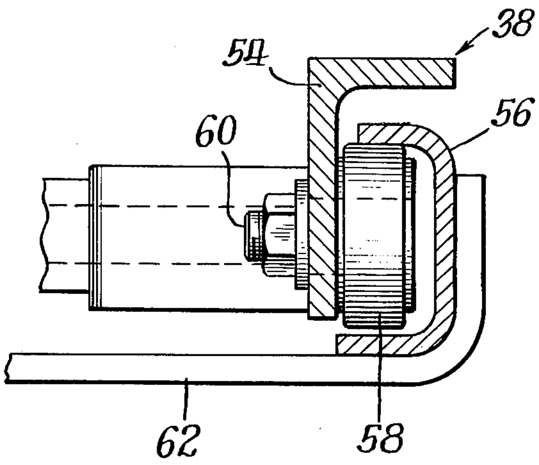
FIG. 4 is a partial cross-sectional view taken along the lines IV—IV in FIG. 3.

Turning to FIG. 4, it may be seen that the side support member comprises a generally L-shaped elongated member 54 associated with a generally U-shaped elongated support member 56. Relative movement between the support member 54,56 is provided by means of a plurality of rollers having bearings, one of which is shown at 58, mounted on a pin or axle 60 fixed through a bore in support member 54. The rollers, as for example roller 58, travel within the U-shaped elongated support member 56 and in contacting relation therewith. The two front support members 36,38 are mirror images of each other and are joined together for stability by means of a tie bar 62 fixed therebetween, as best seen in FIG. 1.

Figure 5:
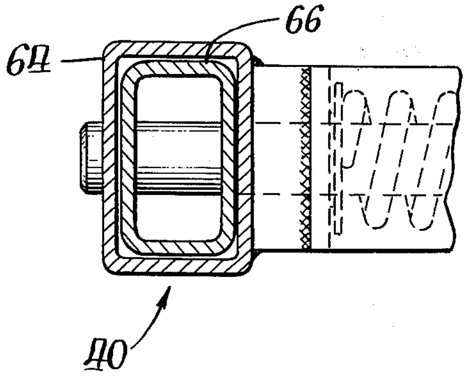
FIG. 5 is a partial cross-sectional view taken along the lines V—V in FIG. 1.

Turning to FIG. 5. the construction of the rear support members is seen to be nesting of a pair of generally hollow box-shaped members 64,66, which are slidably telescopable.

Turning to FIG. 3, it may be noted that a spring biasing means in the form of a compressible gas spring 68 having a cylinder body 70 and a rod 72 extending therefrom is provided for the purpose of biasing the overhead guard into the raised position. It should be understood that a similar spring is provided in the other one of the front support members (not shown).

A retractable pin locking means is provided with each of the support members. For example, FIG. 3 shows one of such locking means 74 for locking member 54 with relation to member 56. Each locking means includess a generally cup-shaped housing 76 which is bolted or otherwise fixed to a support member. A spring 78 contained within the cup-shaped member 76 biases a stepped locking pin 80 by means of a disk-shaped washer 82 into a locked position wherein the pin is inserted within aligned holes 84,86 in support members 54,56, respectively. When the overhead guard is collapsed, pin 80 is inserted within an upper hole 88.

To retract the pin and thereby permit raising or lowering of the guard, the locking means further includes a pair of links 90,92 which are connected at one end thereof by a pivot 94. The other end of link 90 is operably connected to one end of pin 80 through a slotted block 96 and a pair of pivot pins 98,100.

The other end of link 92 is connected to a cable 102 which is supported by a bracket 104 mounted on support member 54.

As seen in FIG. 2, cable 102 is connected to a bell crank 106, and cross shaft 108 to a manually operable L-shaped handle 110 which is generally horizontally mounted beneath the underside of roof member 32. Cross shaft 108 is fixed for rotation by means of appropriate bushings 112. Thus, by manually actuating handle 110, cable 102 is retracted to pull link 92 against bearing surface 114. In this manner motion is translated to retract pin 80 against the biasing spring 78 and thereby withdraw the pin from hole 86. The operator and gravity will operate to bias the guard into the collapsed position.

In this manner, the overhead guard is securely locked in both the raised and collapsed positions, thereby affording operator protection.

It is to be understood that the foregoing description is merely illustrative of a preferred embodiment of the invention and that the scope of the invention is not be limited thereto but is to be determined by the scope of the appended claims.

What is claimed is:

1. In combination a retractable overhead guard with a vehicle, said guard comprising:

a substantially rectangular top member defining, a pair of front and rear corners, a pair of forward telescoping support members rigidly fixed to both side front corners of said top member and said vehicle, a pair of rear telescoping support members, means pivotally connecting said rear telescoping support members to said rear corners of said top member and said vehicle, and locking means on said guard for retaining said telescoping support members in a selective plurality of positions so that said vehicle is capable of operating in areas where low overhead clearance is a requirement.

2. The invention of claim 1 wherein each of said forward telescoping support members comprise generally elongated members, mounting a plurality of roller means for facilitating relative movement therebetween.

3. The invention of claim 1 wherein each of said rear telescoping support members comprises hollow, box-shaped members, and wherein said members are slidingly telescoped together for relative movement therebetween.

4. The invention of claim 1 wherein said telescoping support members include biasing means for urging said telescoping support members to a raised position.

5. The invention of claim 4 wherein said biasing means comprises a spring means connected to said telescoping support members.

6. The invention of claim 5 wherein said spring means is a gas spring.

7. The invention of claim 1 wherein each of said front telescoping support members comprise a first, L-shaped member and a second, U-shaped member retained and guided by said roller means rotatably attached to said L-shaped member.

8. The invention of claim 7 wherein said roller means further include bearings.

* * * * *